United States Patent
Grant, Jr.

(10) Patent No.: US 6,222,009 B1
(45) Date of Patent: Apr. 24, 2001

(54) REDUCTION OF ALKYL-ARYL POLYMERIC KETONES USING A METAL ALKOXIDE

(75) Inventor: Herbert W. Grant, Jr., Greenville, SC (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 09/365,529

(22) Filed: Aug. 2, 1999

(51) Int. Cl.$^7$ .................................. C08F 6/06; C08J 3/07
(52) U.S. Cl. .................... 528/485; 528/225; 528/491; 528/495; 528/497; 528/503
(58) Field of Search .................... 528/485, 225, 528/491, 495, 497, 503

(56) References Cited

U.S. PATENT DOCUMENTS 4,731,434    3/1988   Dörffel ............................. 528/227

OTHER PUBLICATIONS

Gregorian et al., "Reduction of Polymeric Carbonyl Groups by Aluminum Isopropoxide," Polymer Letters, 1964, pp. 481–482.
Kun et al., "Electron Exchange Polymers, XIV. Steric Hindrance in the Chemical Modification of High Polymers," Journal of Polymer Science, 1960, vol. XLIV, pp. 383–389.

Primary Examiner—Duc Troung

(74) Attorney, Agent, or Firm—Pennie & Edmonds LLP

(57) ABSTRACT

The present invention is directed to a process for producing a polymeric alkyl-aryl alcohol resin, and to resins produced by the process of the invention. In the process of the invention (which uses a Meerwein-Pondorff-Verley reduction), a mixture of a polymeric alkyl-aryl ketone resin and a metal alkoxide reducing agent is combined in a solvent. The mixture is refluxed to form a polymeric metal alkoxide intermediate and a ketone (which is removed from the mixture to allow the reaction to go to completion). The solvent reacts with the metal alkoxide intermediate to form a polymeric alkyl-aryl alcohol. Preferably, the metal alkoxide reducing agent is aluminum isopropoxide, and the solvent is isopropyl alcohol, the use of which may result in the regeneration of the aluminum isopropoxide when the polymeric alkyl-aryl alcohol is formed. The invention is also directed to a process for making a non-aqueous ink and to inks formed with the process of the invention. In the process, a polymeric alkyl-aryl alcohol, as described above, is formed, and blended with at least one solvent, a novalac resin, a lubricant, such as a sesquloleate, and a pigment to form the ink. Useful ink solvents include, but are not limited to, glycols, glycol ethers, cyclic amides, alcohols, and mixtures thereof.

24 Claims, 1 Drawing Sheet

REDUCTION OF ALKYL-ARYL POLYMERIC KETONES USING A METAL ALKOXIDE

FIELD OF THE INVENTION

The invention is directed to the formation of alkyl-aryl alcohol resins for use in inks. In particular, the invention is directed to a process of forming polymeric alkyl-aryl alcohol resins by reducing alkyl-aryl polymeric ketone, using aluminum isopropoxide as a catalyst at a temperature of about 20° to about 90° C. and at atmospheric pressure.

BACKGROUND

Alkyl-aryl alcohol resins are useful in a variety of inks and other coatings. When used in non-aqueous ballpoint pen inks, alkyl-aryl alcohol resins provide a highly viscous ink that typically performs well over a large temperature range, typically from below 0° C. to temperatures experienced in the tropics, and maintains a flow capacity that allows the immediate start of writing, while assuring smooth, continuous writing over the temperature range without skipping, running, spotting, or droplet formation at the pen tip, even under conditions of high temperature and humidity.

One prior art method commonly used to form an alkyl-aryl alcohol resin was to hydrogenate an alkyl-aryl ketone/formaldehyde resin, such as that disclosed in U.S. Pat. No. 4,731,434 to Dörffel et al.

Alkyl-aryl ketone/formaldehyde resins may be formed by mixing formaldehyde, acetophenone, and a strong base, such as KOH, in methanol at reflux. The only acidic proton in the solution, the a-hydrogen to the carbonyl, is removed by the base to form an enolate, which can attack electron-deficient sites, such as the carbonyl carbons of the formaldehyde and the acetophenone. As aldehydes are more susceptible to nucleophilic attack than ketones, the enolate preferentially attacks the carbonyl carbon of the formaldehyde, forming an alkoxide. The alkoxide extracts a hydrogen from the methanol solvent, regenerating the base, and forming 3-hydroxy-1-phenyl propan-1-one. Further extraction of α-hydrogen by the base results in the elimination of the OH group, and the formation of a vinyl phenyl ketone, which is formed preferentially because of the stability of the conjugated double bonds. By maintaining the basic conditions at a temperature of greater than 25° C., the α,β-unsaturated ketone polymerizes to form the desired polymeric alkyl-aryl ketone resin.

In the prior art, the polymeric alkyl-aryl ketone was typically converted to a polymeric alkyl-aryl alcohol resin by reducing the polymeric ketone resin under conditions of high pressure and temperature, typically about 300 bar at about 135° C. to about 220° C., in the presence of hydrogen gas, nickel, and a chromium activated copper catalyst. These conditions result in the transfer of one hydrogen to each carbonyl carbon and each carbonyl oxygen, giving the desired polymeric alkyl-aryl alcohol.

However, heavy metal catalysts are toxic, and cause handling and waste disposal problems. Moreover, the required high temperature and pressure conditions, as well as the use of hydrogen gas, are hazardous. Therefore, a need exists for a relatively low temperature and pressure process for forming polymeric alkyl-aryl alcohol resins that does not require heavy metals. The present invention provides such a process.

SUMMARY OF THE INVENTION

The present invention is directed to a process for producing a polymeric alkyl-aryl alcohol resin by reducing a polymeric alkyl-aryl ketone resin, and is also directed to the resins produced with the process of the invention. The process of the invention comprises forming a mixture of a polymeric alkyl-aryl ketone resin and a metal alkoxide reducing agent in a solvent, such as an alcohol, toluene, xylene, and mixtures thereof; refluxing the mixture to form a metal alkoxide intermediate and a ketone; removing the ketone from the mixture; and reacting the solvent with the metal alkoxide intermediate to form a polymeric alkyl-aryl alcohol. Useful alkyl-aryl resins include condensation products of aliphatic (acetone) or aromatic (acetophenone) ketones and aliphatic (formaldehyde) or aromatic (benzaldehyde) aldehydes. These resins include, but are not limited to, poly(vinyl methyl ketone) and poly(vinyl phenyl ketone) and mixtures thereof. Useful metal alkoxide reducing agents include, but are not limited to aluminum isopropoxide, aluminum tert-butoxide, lanthanide isopropoxide, zirconium isopropoxide, and mixtures thereof. With the appropriate choice of solvent and metal alkoxide reducing agent, such as isopropyl alcohol and aluminum isopropoxide or tert-butyl alcohol and aluminum tert-butoxide, the reducing agent may be regenerated as the polymeric alkyl-aryl alcohol is formed in the last step of the process.

The high temperature and pressure conditions required in prior art processes are avoided in the process of the invention, which is typically carried out at a reflux temperature of from about 20° C. to about 90° C. and atmospheric pressure. The endpoint of the reaction can be easily be determined by an absence of the production of ketone. Preferably, the presence or absence of the ketone is determined using a spectroscopic method known in the art, and is most preferably determined using Fourier Transform Infrared spectroscopy ("FTIR").

Preferably, the process comprises forming a mixture of a polymeric alkyl-aryl ketone resin and an aluminum isopropoxide reducing agent in an isopropyl alcohol solvent; refluxing the mixture to form an aluminum alkoxide intermediate and acetone; removing the acetone from the mixture; and reacting the isopropyl alcohol solvent with the aluminum alkoxide intermediate to form a polymeric alkyl-aryl alcohol. Typically, from about 10 to about 200 parts by weight of aluminum isopropoxide per 100 parts by weight of polymeric alkyl-aryl ketone resin is mixed with the resin in about 400 to about 1500 parts by weight of the solvent, and the aluminum isopropoxide is regenerated in the process.

The invention is also directed to a process for making a non-aqueous ink and to inks formed with the process of the invention. The process comprises forming a polymeric alkyl-aryl alcohol, as described above, and blending the polymeric alkyl-aryl alcohol resin with at least one solvent, a novalac resin, a lubricant, such as a sesquloleate, and a pigment to form the ink. Useful solvents include, but are not limited to, glycols, glycol ethers, cyclic amides, alcohols, and mixtures thereof.

DETAILED DESCRIPTION OF THE INVENTION

Figure 1:
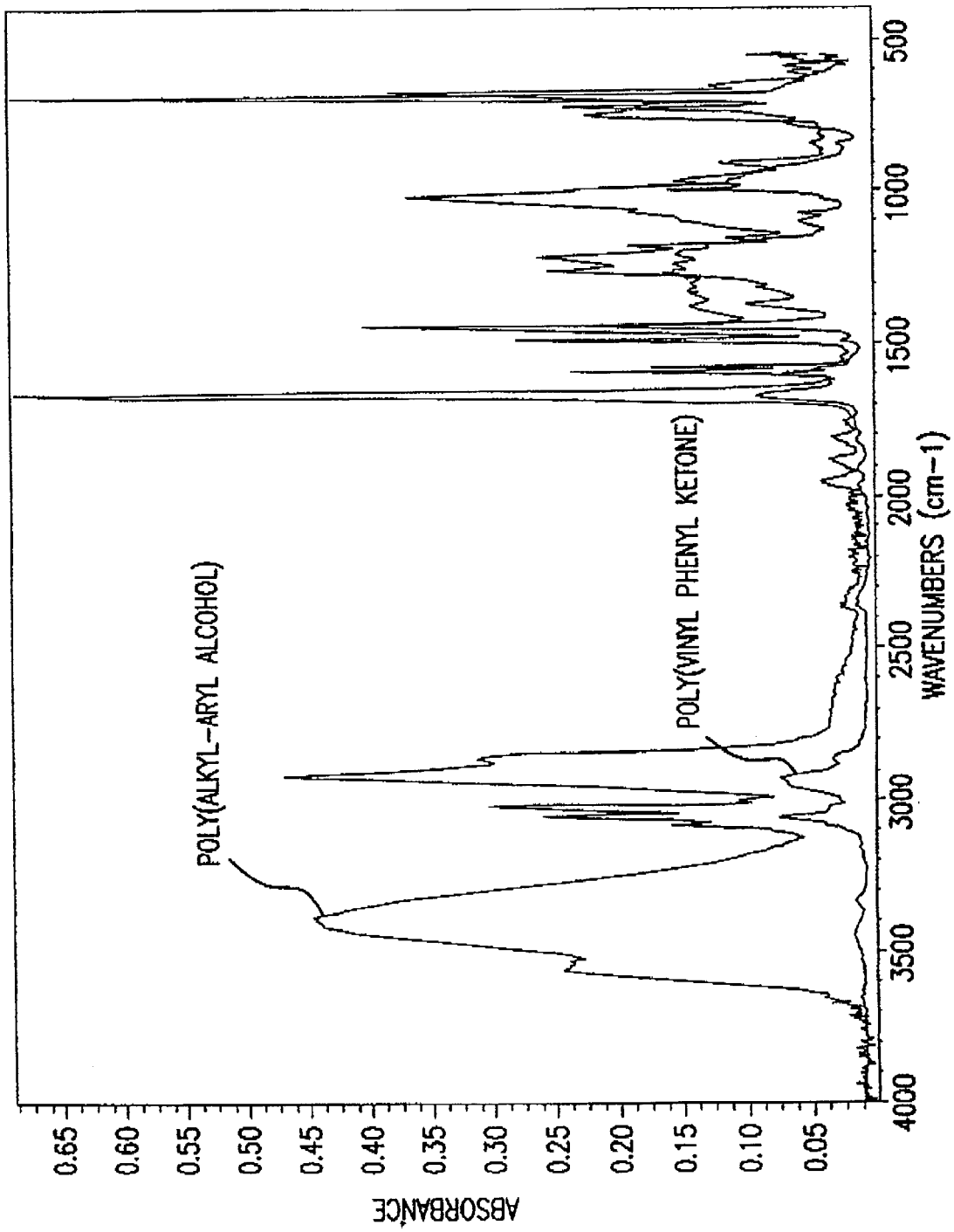
FIG. 1 compares the FTIR spectrum of an experimental polymeric (alkyl aryl alcohol) resin with that of the poly(vinyl phenyl ketone) starting material.

The present invention is directed to a novel process for producing polymeric alkyl-aryl alcohol resins by reducing the carbonyl groups of alkyl-aryl-ketones with a Meerwein-Pondorff-Verley reducing agent and to alkyl-aryl alcohol resin produced with the process of the invention. The Meerwein-Pondorff-Verley reducing agent is a Lewis acid that comprises a metal, preferably aluminum, and acts as a catalyst that in at least one embodiment can be regenerated in the process. The invention eliminates the need for heavy metal catalysts, hydrogen gas, and high temperature and pressure reaction conditions. Thus, the invention provides safer reaction conditions, reduces the problem of the disposal of toxic wastes, and uses cheaper raw materials. The resultant production of alkyl-aryl alcohol resins is safer for the environment, less costly than prior art methods, and provides an alkyl-aryl alcohol resin that is at least as good as prior art resins with respect to properties useful in inks and coatings.

Typical reaction conditions for the process of the invention are atmospheric pressure and a temperature of from about 20° to about 90° C., in contrast to prior art technologies that require a temperature on the order of about 135° C. to about 220° C. and a pressure of up to about 300 bar, i.e., nearly 300 atmospheres. The process of the invention provides polymeric alkyl-aryl alcohol resins in high yield and at reduced cost, which, when used in ball point pen inks, provide smooth writing with excellent age stability that is at least equivalent to prior art alkyl-aryl alcohol resins. Moreover, the catalyst used in the invention may be regenerated in the process, reducing waste disposal problems.

Useful Meerwein-Pondorff-Verley reducing agents include, but are not limited to metal alkoxides, such as aluminum isopropoxide, aluminum tert-butoxide, lanthanide isopropoxide, zirconium isopropoxide, and mixtures thereof. Preferably, the reducing agent is aluminum isopropoxide. Typically, the reaction is performed in an alcohol solvent, which is preferably isopropanol. However, toluene, xylene, and mixtures thereof are also useful as solvents in the process of the invention. Aryl-aryl ketones useful for producing polymeric alky-aryl alcohol resins in the process of the invention include, but are not limited to, poly(vinyl methyl ketone), poly(vinyl phenyl ketone), and mixtures thereof.

Preferably, the polymeric alkyl-aryl ketone resin is produced by polymerizing acetophenone and formaldehyde in an aldol condensation reaction. In a preferred embodiment of the invention, the resulting polymeric alkyl-aryl ketone resin is mixed with aluminum isopropoxide, $Al(OCH(CH_3)_2)_3$, in isopropanol ("IPA"), and heated to a temperature of from about 20° to about 90° C., and refluxed. Because the aluminum is a good Lewis acid, it is attacked by the carbonyl oxygen of the resin, forming a cyclic transition state.

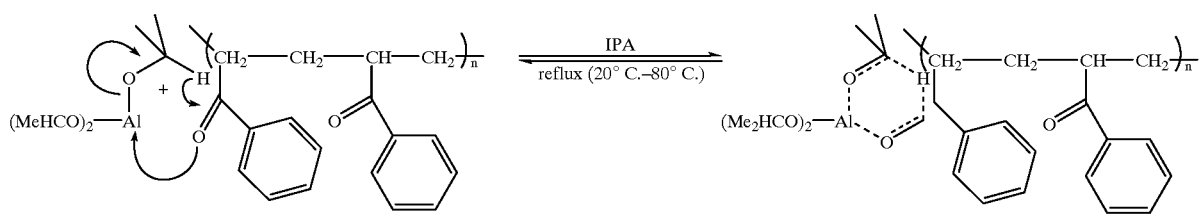

A hydrogen is transferred to the carbonyl carbon as shown below to form an aluminum alkoxide intermediate and acetone.

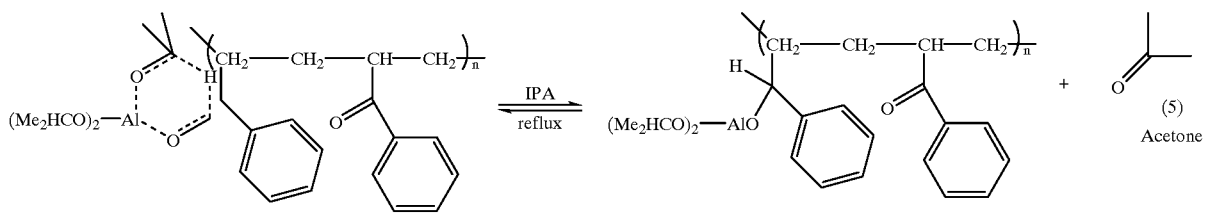

The reaction is an equilibrium reaction, and, thus, the acetone must be distilled off to drive the reaction to the right.

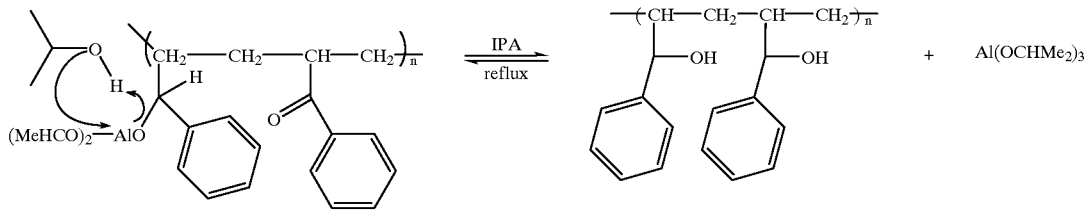

The aluminum in the aluminum alkoxide is then attacked by the oxygen of the isopropanol. The oxygen in the aluminum alkoxide then extracts the proton from the oxygen of the isopropanol to give the polymeric alcohol resin, regenerating the aluminum isopropoxide. The regeneration of the aluminum isopropoxide allows the subsequent use of the catalyst, reducing the cost of reaction materials.

Typically, from about 85 to about 95 percent of the polymeric resin is recovered following the reduction process, with a conversion of ketone functionality to alcohol functionality of from about 50 to about 90 percent. The resin produced by the process of the invention has properties that are at least as good as those of the prior art resins, as shown in the examples below.

EXAMPLES

The following non-limiting examples are merely illustrative of the preferred embodiments of the present invention, and are not to be construed as limiting the invention, the scope of which is defined by the appended claims.

Example 1

A polymeric alkyl-aryl ketone resin, formed from the aldol condensation of acetophenone and formaldehyde poly(vinyl phenyl ketone), was reduced to the corresponding experimental polymeric alkyl-aryl alcohol resin by forming a mixture of 10 g of aluminum isopropoxide and 20 g of the polymeric alkyl-aryl ketone resin in 200 ml of isopropanol. The resulting mixture was refluxed at a temperature of 82.5° C., while distilling off the acetone byproduct. After 6 hours, the production of acetone stopped, indicating that the end point of the reduction of the polymeric alkyl-aryl ketone resin had been reached. The resulting polymeric aluminum alkoxide resin adduct was then washed with 20% by volume HCl. This washing formed the aluminum salt (a white powder), which precipitated out and liberated the polyalkyl-aryl alcohol resin (a yellow insoluble solid). The liquid (acid wash phase) and white precipitate were then decanted from the resin. The resin was then solubilized in methylene chloride, and washed with water, and the resin was recovered by removing the methylene chloride using low pressure. The 20 g of polymeric alkyl-aryl ketone resin yielded 17 g of polymeric alkyl-aryl alcohol resin for a yield of 85 percent.

Example 2

A sample of the alkyl-aryl alcohol resin produced in example 1 and a sample of a poly(vinyl phenyl ketone) resin starting material were analyzed with a Nicolet Magna-IR 560 FTIR Spectrophotometer. The spectra obtained are shown in FIG. 1. As can be seen from the two spectra, the carbonyl band near 1700 $cm^{-1}$ has decreased and the OH band at 3400 $cm^{-1}$ has increased, indicating that the aluminum isopropoxide reduced the poly(vinyl phenyl ketone) resin to a polyalkyl-aryl alcohol resin. In the following examples, inks comprising the resin formed with the process of the invention have writing properties that are at least as good as prior art inks.

Example 3

Black ball point pen inks were formed by mixing 15 to 30 percent of the polymeric alkyl-aryl alcohol resin produced in example 1 with 0.5 to 5 percent by weight of a glycol ether solvent, 20 to 40 percent by weight of a cyclic amide solvent, 4 to 10 percent by weight of a novolac resin, 0.5 to 5 percent of a sesquloleate lubricant, and 30 to 50 percent by weight of a black pigment. The resulting inks provided exceptionally smooth writing and superior stability on aging.

Example 4

The inks produced in example 3 were subjected to the 148-meter laydown test and the handwriting test, and the results were compared to inks comprising alkyl-aryl alcohols produced with prior art methods. In the 148-meter test, a pen is weighed both before and after writing a 148-meter line onto paper to determine the amount of ink distributed onto the paper. For a standard black ink formulation comprising an alkyl-aryl alcohol resin produced with the process of the invention, from about 24 mg to about 30 mg of ink was required in the 148 meter test, in comparison with from about 26 mg to about 32 mg that was used with a standard black ink formulation comprising a prior art alkyl-aryl alcohol.

In the handwriting test, three lines of script are written with each of five pens. The number of letters required for the pen to start writing is determined, and the ease of writing, smoothness, and line intensity are compared. The results obtained with an ink formed in accordance with the invention were at least as good as those obtained with standard prior art pens, with the exception of one pen, which, after aging for six months at 40° C. and 80% relative humidity, required a few circular strokes to unblock the point, and start writing. Once started, the writing of that pen was at least as good as the other pens.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

What is claimed:

1. A process for producing a polymeric alkyl-aryl alcohol resin, the process comprising:

forming a mixture of a polymeric alkyl-aryl ketone resin and a metal alkoxide reducing agent in a solvent;

refluxing the mixture to form a metal alkoxide intermediate and a ketone; removing the ketone from the mixture; and reacting the solvent with the metal alkoxide intermediate to form a polymeric alkyl-aryl alcohol.

2. The process of claim 1, further comprising selecting the polymeric alkyl-aryl ketone from the group consisting of poly(vinyl methyl ketone), poly(vinyl phenyl ketone), and mixtures thereof.

3. The process of claim 1, further comprising selecting the solvent from the group consisting of alcohols, toluene, xylene, and mixtures thereof.

4. The process of claim 1, further comprising selecting the metal alkoxide reducing agent from the group consisting of aluminum isopropoxide, aluminum tert-butoxide, lanthanide isopropoxide, zirconium isopropoxide, and mixtures thereof.

5. The process of claim 1, further comprising selecting aluminum isopropoxide as the metal alkoxide reducing agent.

6. The process of claim 1, further comprising selecting isopropyl alcohol as the solvent.

7. The process of claim 1, further comprising selecting isopropyl alcohol as the solvent and aluminum isopropoxide as the reducing agent, and regenerating the aluminum isopropoxide when the polymeric alkyl-aryl alcohol is formed.

8. The process of claim 1, further comprising refluxing the mixture at a temperature of from about 20° C. to about 90° C.

9. The process of claim 1, further comprising refluxing the mixture at atmospheric pressure.

10. The process of claim 1, further comprising selecting a condensation product of acetophenone and formaldehyde as the polymeric alkyl-aryl ketone resin.

11. The process of claim 1, further comprising determining a reaction endpoint by an absence of ketone.

12. The process of claim 11, further comprising determining the reaction endpoint measured using Fourier Transform Infrared spectroscopy.

13. A polymeric alkyl-aryl alcohol resin formed by the process of claim 1.

14. A process for producing a polymeric alkyl-aryl alcohol resin, the process comprising:

forming a mixture of a polymeric alkyl-aryl ketone resin and an aluminum isopropoxide reducing agent in an isopropyl alcohol solvent;

refluxing the mixture to form an aluminum alkoxide intermediate and acetone;

removing the acetone from the mixture; and reacting the isopropyl alcohol solvent with the aluminum alkoxide intermediate to form a polymeric alkyl-aryl alcohol.

15. The process of claim 14, further comprising forming the mixture by mixing from about 10 to about 200 parts by weight aluminum isopropoxide per hundred parts per weight of the polymeric alky-aryl ketone resin in from about 400 to about 1500 parts by weight of the solvent.

16. The process of claim 14, further comprising regenerating the aluminum isopropoxide when reacting the alcohol with the intermediate.

17. The process of claim 14, further comprising removing the acetone by distilling the refluxed mixture.

18. The process of claim 14, further comprising determining a reaction endpoint by an absence of acetone.

19. The process of claim 18, further comprising determining the reaction endpoint using Fourier Transform Infrared spectroscopy.

20. A polymeric alkyl-aryl alcohol resin formed by the process of claim 14.

21. A process for making a non-aqueous ink, the process comprising:

forming a mixture of a polymeric alkyl-aryl ketone resin and a metal alkoxide reducing agent in a solvent;

refluxing the mixture to form an metal alkoxide intermediate and a ketone;

removing the ketone from the mixture;

reacting the solvent with the aluminum alkoxide intermediate to form a polymeric alkyl-aryl alcohol; and blending the polymeric alkyl-aryl resin with at least one ink solvent, a novalac resin, a lubricant, and a pigment to form the ink.

22. The process of claim 21, further comprising selecting the ink solvent from the group consisting of glycols, glycol ethers, cyclic amides, alcohols, and mixtures thereof.

23. The process of claim 21, further comprising selecting a sesquloleate as the lubricant.

24. An ink formed by the process of claim 21.

* * * * *